Figure 1:
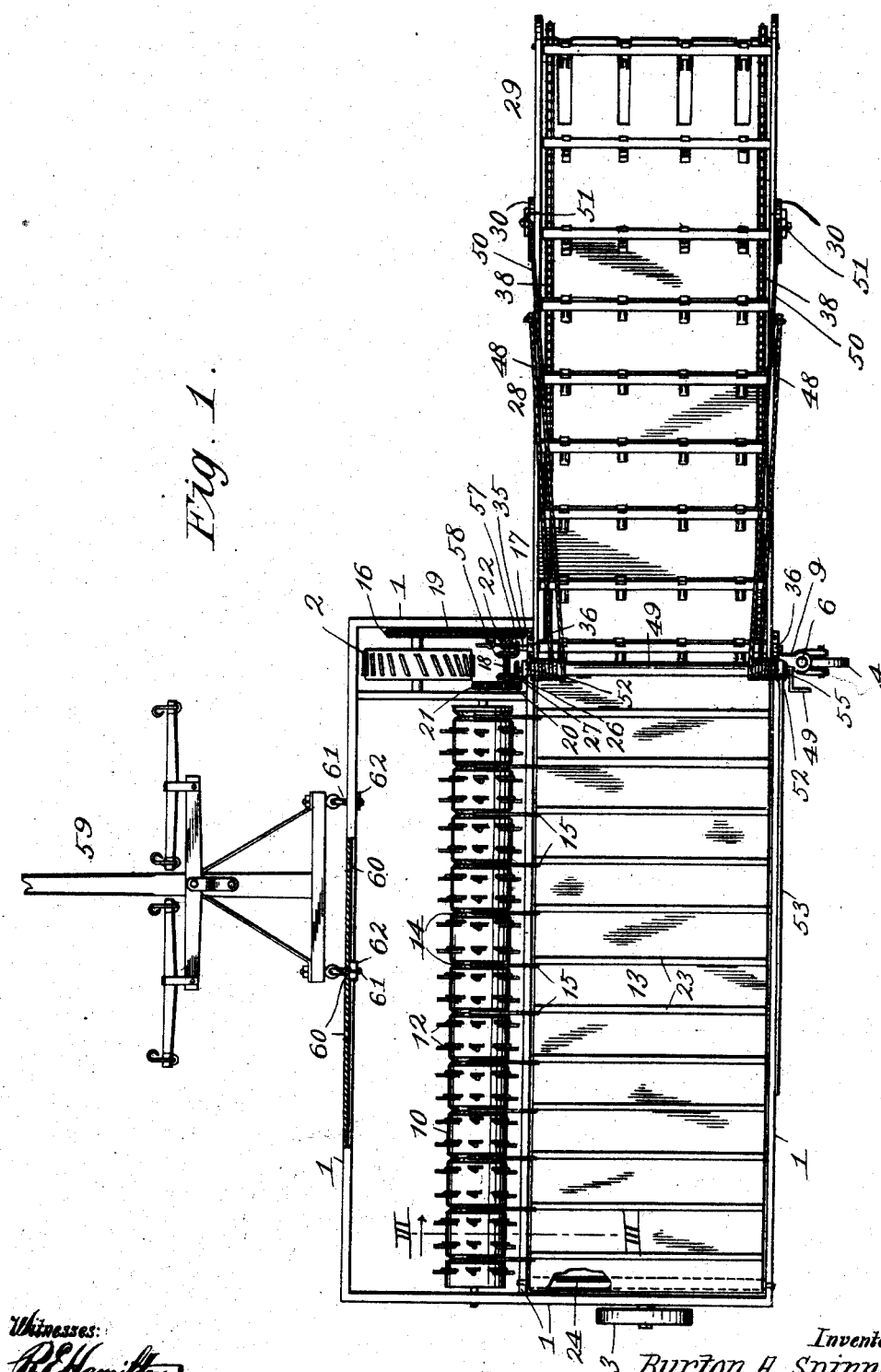

B. A. SPINNEY.
COMBINED HAY RAKE AND LOADER.
APPLICATION FILED OCT. 11, 1907.

927,182.

Patented July 6, 1909.
2 SHEETS—SHEET 1.

Witnesses:
R. E. Hamilton.
M. Cox.

Inventor,
Burton A. Spinney,
By F. G. Fischer, Atty.

B. A. SPINNEY.
COMBINED HAY RAKE AND LOADER.
APPLICATION FILED OCT. 11, 1907.
927,182.
Patented July 6, 1909.
2 SHEETS—SHEET 2.
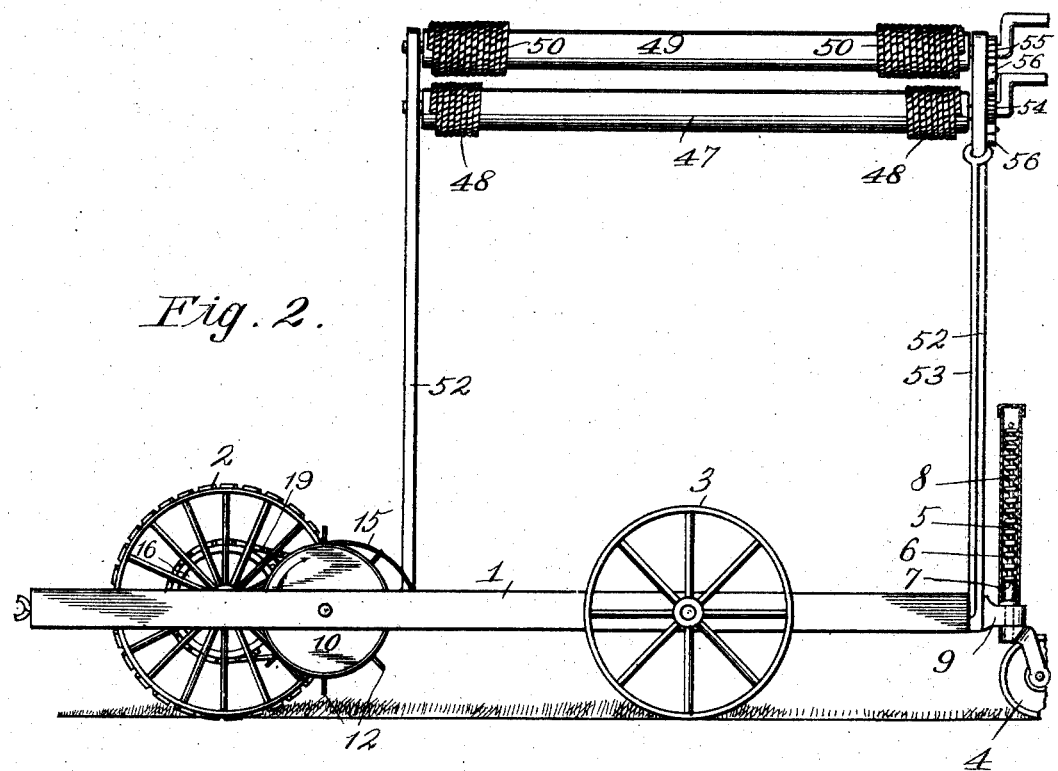
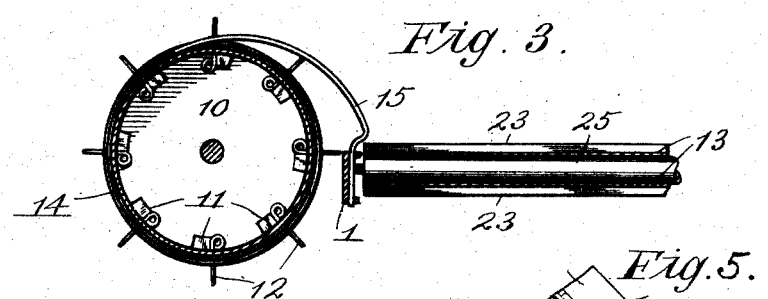
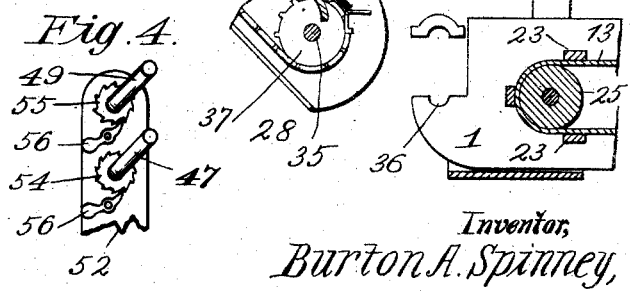
Witnesses:
R. C. Hamilton
E. A. Cahill
Inventor,
Burton A. Spinney,
By F. G. Fischer, Atty.

UNITED STATES PATENT OFFICE.

BURTON A. SPINNEY, OF MASSENA, IOWA.

COMBINED HAY RAKE AND LOADER.

No. 927,182.  Specification of Letters Patent.  Patented July 6, 1909.

Application filed October 11, 1907. Serial No. 396,892.

*To all whom it may concern:*

Be it known that I, BURTON A. SPINNEY, a citizen of the United States, residing at Massena, in the county of Cass and State of Iowa, have invented certain new and useful Improvements in Combined Hay Rakes and Loaders, of which the following is a specification.

My invention relates to improvements in combined hay-rakes and loaders; and my object is to provide an interchangeable machine which may be either arranged to gather hay and deliver it in a windrow or gather the hay and deliver it to a vehicle drawn beside the machine.

In order that the invention may be fully understood reference will now be made to the accompanying drawings, in which:—

Figure 1 is a plan view of my improved machine. Fig. 2 is a side elevation of the same with the elevator removed. Fig. 3 is an enlarged broken section on line III—III of Fig. 1. Fig. 4 is a detail of a pair of windlasses employed in controlling the elevator. Fig. 5 is a broken detail view showing the receiving end of the elevator disengaged from the delivery end of the rake.

In carrying out the invention, I employ a frame 1, mounted upon a master-wheel 2, a wheel 3, and a yieldingly-mounted caster-wheel 4, which latter is located in the rear of the frame and provided with an elongated vertical stem 5 extending upwardly into a gas-pipe 6, and having a shoulder 7 upon which the lower end of an expansion spring 8 rests, the upper end of said spring being attached to the gas-pipe, which in turn is secured to a bearing 9, projecting from the rear side of the frame. By thus yieldingly mounting the caster-wheel it may readily accommodate itself to the uneven surface of the ground as the machine is drawn along.

10 designates a rotary cylinder journaled in the forward portion of the frame and extending transversely to the line of draft. Said cylinder is provided with longitudinal slats 11, each of which carries a series of gathering-teeth 12 for picking up the hay from the ground and delivering it upon a traveling apron 13, extending longitudinally of the cylinder. Cylinder 10 is provided with peripheral grooves 14 in which the free ends of a series of cleaning-teeth 15 rest, the rear ends of said cleaning-teeth being secured to frame 1, as shown more clearly in Fig. 3. Said cleaning-teeth are for the purpose of releasing the hay from the gathering-teeth after the latter have lifted the hay to the top of the cylinder, and in order to prevent it from dropping down between the rear of the cylinder and the adjacent portion of the frame, the rear portions of the cleaning-teeth 15 are arranged to overlap the traveling apron 13 so that all of the hay will be deposited thereon. Cylinder 10 is driven by the master-wheel 2, through the instrumentality of a sprocket-wheel 16, mounted upon the shaft of the master-wheel, a sprocket-wheel 17 mounted upon a counter-shaft 18 journaled in the frame, an endless sprocket chain 19 running over the sprocket-wheels, a cog-wheel 20 fixed to shaft 18, and a cog-wheel 21 fixed to one end of the cylinder shaft and intermeshing with cog-wheel 20. Sprocket-wheel 17 is loosely mounted upon shaft 18 so that when a clutch 22 is disengaged therefrom it will revolve without driving the cylinder.

Apron 13 is provided with slats 23 and travels over two rollers 24 25 journaled at opposite sides of the frame. Roller 25 is provided at one end with a bevel gear wheel 26, which is driven by a bevel gear wheel 27 mounted upon shaft 18. Apron 13 may deliver the hay in a windrow upon the ground or it may deliver it to an elevator having two adjustable sections 28 29, hinged together at 30. The elevator is carried by a shaft 35 extending through the lower portion of section 28 and journaled in bearings 36 in the delivery end of frame 1. Shaft 35 is provided with sprocket-wheels 37 around which endless sprocket-chains 38 travel. Said sprocket-chains extend upwardly to the delivery end of section 29 where they travel around sprocket-wheels 39, they being guided to and from said sprocket-wheels by idlers 40 41, at the hinged portion of the sections.

The elevator is raised and lowered by means of a windlass 47 and a pair of cables 48, the ends of which latter are attached to the windlass and the upper end of section 28. Section 29 is controlled independently of section 28 through the medium of a windlass 49 and a pair of cables 50, which latter are attached to the windlass and a pair of arms 51 secured near the hinged end of section 29. Windlasses 47 49 are journaled in a pair of standards 52 secured to the delivery end of frame 1, said standards being further secured by a brace 53 extending from the frame. Windlasses 47 49 are prevented from accidentally turning by ratchet-wheels 54 55, respectively, which are normally engaged by a pair of gravity-pawls 56. With the above arrangement it is obvious that the discharge end of the elevator may be adjusted close to the vehicle when starting to load the latter and then be gradually raised as the load increases in height. This is quite an advantage on a windy day as it prevents the hay from being scattered. Shaft 35 is provided at one end with a fixed bevel gear wheel 57 which is driven by a bevel gear wheel 58 mounted upon shaft 18.

59 designates a tongue which is adjustably secured to frame 1 to avoid side draft, said tongue being provided with eye-bolts 61 adapted to enter any of the holes 60 in the frame, to which latter the eye-bolts are secured by nuts 62.

While I have shown the preferred form of the invention, I do not wish to be confined to the exact construction shown, as it is obvious that changes may be made without departing from the spirit or scope of the appended claims.

Having thus described my invention, what I claim is:—

1. In a machine of the character described, a wheeled frame, a rotary cylinder adjacent the ground and journaled in said frame, said cylinder having peripheral grooves, gathering-teeth projecting from the periphery of said cylinder, a traveling apron adjacent to the cylinder and extending longitudinally thereof, and cleaning-teeth overlapping the cylinder and the apron and having their free ends arranged in the peripheral grooves.

2. In a machine of the character described, a frame, wheels carrying the same, a toothed cylinder adjacent the ground and journaled in said frame, said cylinder being arranged transversely to the line of draft and having peripheral grooves, gearing for transmitting power from one of the wheels to the cylinder, a traveling apron adjacent the cylinder and extending longitudinally thereof, and cleaning-teeth secured to the frame, the free ends of said teeth lying in the grooves of the cylinder while their fixed portions overlap the apron.

In testimony whereof I affix my signature, in the presence of two witnesses.

BURTON A. SPINNEY.

Witnesses:
W. L. DAVIS,
WRAY WILSON.